United States Patent [19]

Oberste-Padtberg

[11] Patent Number: 5,006,177

[45] Date of Patent: Apr. 9, 1991

[54] PROCESS AND COMPOSITION FOR CEMENTING WELLS PASSING THROUGH SALT FORMATIONS

[75] Inventor: Rüdiger Oberste-Padtberg, Merrheim, France

[73] Assignee: Dowell Schlumberger Incorporated, Tulsa, Okla.

[21] Appl. No.: 677,965

[22] Filed: Dec. 4, 1984

[30] Foreign Application Priority Data

Dec. 19, 1983 [FR] France ................. 83 20303

[51] Int. Cl.$^5$ ............................................ C04B 24/34
[52] U.S. Cl. ................... 106/805; 106/315; 106/638; 106/717
[58] Field of Search ............. 166/292, 293; 106/90, 106/314, 76, 89

[56] References Cited

U.S. PATENT DOCUMENTS

| | | | |
|---|---|---|---|
| 2,238,930 | 4/1941 | Chamberlain et al. | 166/292 |
| 2,961,044 | 11/1960 | Shell | 166/292 |
| 3,835,926 | 9/1974 | Clement, Jr. | 106/76 X |
| 3,928,052 | 12/1975 | Clement, Jr. | 106/89 X |
| 4,036,301 | 7/1977 | Powers et al. | 166/293 |
| 4,257,483 | 3/1981 | Morris et al. | 166/292 |
| 4,450,009 | 5/1984 | Childs et al. | 166/293 |
| 4,461,644 | 7/1984 | Childs et al. | 106/76 |
| 4,466,833 | 8/1984 | Spangle | 106/88 |
| 4,482,379 | 11/1984 | Dibrell et al. | 106/76 |

OTHER PUBLICATIONS

Petroleum Production Engineering Oil Field Development, Fourth Edition, L. C. Uren, pp. 480–489, 1956 (Uren).

*Primary Examiner*—William R. Dixon, Jr.
*Assistant Examiner*—A. Wright
*Attorney, Agent, or Firm*—Stephen A. Littlefield

[57] ABSTRACT

The present invention relates to a composition for cementing, containing a small amount of NaCl and from 35 to 150 l/t of sodium silicate. A cement-salt bond having good characteristics such as rheology, fluid loss, etc. . . . is obtained.

3 Claims, No Drawings

PROCESS AND COMPOSITION FOR CEMENTING WELLS PASSING THROUGH SALT FORMATIONS

The present invention relates to the cementing of boreholes, and more particularly of oil wells.

Any well which is bored through subterranean rocks in order to produce or inject fluids, has to be cemented, inter alia, to maintain its integrity and also to maintain control of the fluids injected or produced.

For the production of fluids, for example for producing crude oil, a string of steel pipe, called the casing, is usually lowered into the borehole. A cement slurry having suitable properties is then prepared on the surface and is injected into the casing. This cement slurry is then displaced, i.e. a displacing fluid is injected thereafter up to a few metres above the shoe of the casing. Almost all of the cement slurry is then pushed into the annular space between the casing and the wall of the borehole.

When in place, the cement slurry is allowed to set and to develop strength in order to support the casing, bond to the rocks of various compositions, and isolate the respective zones from any fluid migration.

An extremely large number of slurry formulations is known in order to tailor the cement slurry properties (mainly: density, setting or thickening time, rheology, water loss, free water, compressive strength, permeability and resistance to chemical degradation) to the respective well requirements.

A good slurry formulation is especially necessary when cementing a well bored through salt formations, as the conditions of equilibrium between the cement and the salt zones are difficult to achieve. If these conditions are not achieved, this will lead to the dissolution of the salts, the migration of the alkalis into the cement, and result in a retarded slurry (mediocre strength development) and a mediocre bond between the cement and the formations traversed.

The present invention proposes an original slurry formulation which surprizingly and decisively improves the cementing of a borehole passing through salt formations, with respect to:
 initial and final compressive strength,
 possibility of adjusting the thickening time
 rheology
 free water characteristics
 compatibility with magnesium salts
 compatibility with the over- or underlying formations which themselves do not contain salts, and
 excellent bond between cement and salt formations.

Two main techniques for effecting cementing through salt formations are currently known: cementing is effected either with slurries containing very large quantities of salts (18% by weight of mix water up to saturation), or slurries containing extremely small quantities of salts (0% or just a few percent of salts with respect to the weight of the mix water).

The first technique consists, therefore, in using high salinity cements.

As the salt formations are drilled with salt-saturated muds, it has appeared logical to cement them with salt-saturated or near saturated slurries so that the slurry used is compatible with the mud used. The main advantage of this technique is that no additional quantity of salt coming from the formation can be dissolved, this leading to a relatively good cement-formation bond.

On the contrary, such high salinity slurries present numerous drawbacks, all extremely serious:

1. The thickening time is difficult to adjust as such slurries are retarded per se.

2. These slurries are always viscous and their rheology is difficult to adapt to a turbulent flow displacement.

3. Fluid loss values of the high salinity slurries are extremely high.

4. High salinity cement slurries are not compatible with certain formations over- or underlying the salt formations traversed. For example, amorphous silica which may be found in certain formations of sandstone and in acid vulcanic rocks, reacts on the salts and forms expanding alkali silicates which may completely destroy the formation as well as the cement. This is known as "alkali silica reaction".

5. In order to achieve pumpability of high salinity cement slurries, which, in some cases, may be very difficult, considerable quantities of retarding plasticizers usually have to be added to these slurries. The slurry thus tends to gel rather than to set normally, and this occurs only after a long period of thickening. Consequently, there is a long period during which the slurry is not liquid and hardly transmits any hydrostatic pressure onto the formation. On the other hand, this slurry is not yet strong enough to support and protect the casing. As the salt formations traversed by the borehole are highly plastic and may easily flow into the borehole under the influence of geostatic pressure, there is obviously a risk of premature collapse of the well casing.

Although this solution may appear logical, it brings, in fact, more drawbacks than advantages.

The second known solution consists in the use of cement slurries containing no salts or only a very small quantity of salts.

This technique is more recent.

It is much easier to control the properties of cement slurries of this type. Their main drawbacks are as follows:

1. In order to reduce the amount of salts incorporated into the cement by abrasion of the rock, this slurry must be pumped into the well very slowly.

2. Nevertheless, despite this precaution, high salt concentrations will occur locally due to dissolutions. As salt concentrations below 15% by weight of mix water have an effect of accelerating setting of the cement, it is necessary, in order to avoid the risk of a flash set, either to premix a certain amount of salts in the slurry or to use retarders. When these two possibilities are implemented, they only make it possible to determine the minimum thickening time. As salt pick up occurs during displacement and setting of the slurry, the thickening time will increase unpredictably.

Salt-free or salt-poor cement slurries have a high capacity for dissolving the salts found in the adjacent rocks. During thickening of the slurry opposite a salt zone, the aqueous phase of the slurry may thus further dissolve certain quantities of salts, this resulting in the appearance of a small gap between the cement and the rocks, and determining a very mediocre bond between the cement and the adjacent formation.

Although such salt-free or poor-salt slurries improve certain characteristics of cementing in salt zones, this technique is not satisfactory either and is limited to only a few specific applications.

It will further be noted that these two known techniques cannot be used when magnesium salts are present in the rock.

The present invention consists in a non salt saturated cement slurry composition for cementing in salt zones, the physical properties of which are not significantly influenced by the introduction into this composition of additional amounts of salts (dissolved or eroded out of the formations traversed), and which will create an original, very solid bond between the cement and the adjacent formations, this composition moreover being compatible with magnesium salts.

The composition according to the invention contains at the beginning only a small quantity of salt (up to 18% NaCl by weight with respect to the mix water). In particular, this reduces the risk of an alkali silica reaction between the composition and the formations over or underlying the salt stratum.

The invention essentially resides in two points:

1. A saturated sodium silicate solution is added to the cement slurry, thus increasing the silica activity;

2. The setting time is controlled by a mixture of lignosulfonate with either borax or citric acid.

The addition of this solution to a medium comprising salt water results in the formation of a sodium silicate gel which decays under basic pH conditions. Consequently, this gel is not stable in a cement slurry, ensuring a good rheology which is not sensitive to an increase in slurry salinity.

The amount of sodium silicate in the system according to the invention must be greater than a limit which may be fixed at about 35 l/t of slurry.

Nevertheless, for a given concentration of NaCl, the addition of sodium silicate to the mix water is limited: the more sodium silicate is added to salt water, the more sodium silicate gel is formed, this reducing the mixability of the cement and its aqueous phase.

The sodium silicate concentration may therefore be limited to about 150 l/t of slurry, this higher concentration further leading to good mix characteristics.

The sodium silicate rich cement slurries are accelerated and are therefore generally difficult to retard. This problem is solved according to the present invention by a combination of a lignosulfonate type retarder (about 1.5 l/t of slurry) and borax (0.5 to 2.0%) or citric acid (0.1 to 0.4%), which enables the thickening time of the system according to the invention to be easily adjusted. Reference will be made in this respect to Table I hereinafter. Table I shows that the retarders of lignosulfonate type (modified or not) and borax are not suitable if they are used alone. On the other hand, the combination of the two provides both a control of the setting time and a good rheology. Table I also shows that citric acid permits good control of the setting time. However, at low temperatures, the required citric acid concentrations are relatively critical: a slight variation in citric acid brings about considerable variations in the thickening time. Therefore, for practical reasons, it will be preferred to use the lignosulfonate/borax combination at low or mean temperatures, and citric acid at high temperatures or in the presence of magnesium salts. When citric acid is used, it is preferable to use it in combination with a dispersant (polynaphthalene-sodium sulfonate) and/or another retarder such as modified lignosulfonates so as to have a good rheology (yield value less than 2.5 Pa) without having an excessively long thickening time, which would be contrary to the desired object.

The compositions according to the present invention lead to original reactions at the interface between the cement and the rocks traversed.

1. As the activities of silicon (addition of sodium silicate), calcium (from the cementing materials), and alkalis (initial addition of salt, and alkalis coming from the adjacent strata) are sufficient in the immediate vicinity of the interface between the cement and the salt stratum, fibrous minerals are formed such as for example Gismondine and Pectolite (both minerals highly stable under basic pH conditions) which lead to an excellent bond between the cement and the salt formation. This bond is original and characteristic of the invention. As a considerable activity of chlorine is to be expected at the contact between the salt stratum and the cement, these minerals will also contain a certain amount of chlorides.

2. The aluminate and ferrous cement phases will also react with the chloride ions to form compounds of formulae $3Ca(Al, Fe)_2O_4 \cdot CaCl_2 \cdot 10H_2O$ and $3Ca(Al, Fe)_2O_4 \cdot 3CaCl_2 \cdot 30H_2O$. These reactions will consume an additional amount of the mobile chloride ions.

3. The hydration of the cement as well as the reactions mentioned above consume a certain amount of water. As the interstitial solution corresponding to the system according to the invention is highly concentrated with respect to silica, the aqueous phase will become silica oversaturated, this resulting in the precipitation of a silica gel containing a certain amount of NaCl. Such a gel is known to constitute a very effective waterproofer and cement hardener.

Whilst, in the heretofore known techniques, a very mediocre bond between the cement and the salt rocks, and even the creation of a gap between the cement and the rocks, was obtained, among other drawbacks, it is observed that, according to the present invention, a precipitation of minerals and the formation of a fibrous transition between the cement and the salt stratum are produced, the whole leading to an original, very solid bond between the cement and the rock.

Apart from this capital point, the main advantages obtained according to the invention may be summarized as follows:

1. Thickening time:

The thickening time may easily be tailored to the majority of stresses created by pumping or the well itself, from less than 1 hour up to more than 7 hours (cf. Table I hereinafter).

It is observed that the increase in salinity by the addition of an additional amount of salts to the basic slurry composition (in order to simulate picking up or dissolution of salts whilst the slurry is being pumped along a salt formation), has virtually no influence on the thickening time. Only large amounts of magnesium salts significantly affect the thickening time, but this may easily be compensated by the addition of the retarder combination lignosulfonate/citric acid described hereinabove.

2. Compressive strength:

The system according to the invention yields early strength values which are higher than those obtained in conventional systems:

The compressive strength according to the invention is about 30% higher after 8 hours (more than 13 mPa instead of less than 10 mPa in the prior art) and about 20% higher after 24 hours curing (Table I hereinafter, composition 10 and 11).

Even slurries according to the invention which have been retarded (thickening time of about 3 hours) still show compressive strength characteristics after 24 hours (about 30 mPa) which cannot be obtained by conventional salt zone cement slurries.

3. Rheological properties:

An excellent rheology, compatible with turbulent flow displacements and high pumping rates (Table I hereinafter) are achieved with the present invention. A yield value of less than 1.3 Pa and plastic viscosities of about 3.5 Pa.s may easily be obtained, even at a salt concentration of 30% by weight with respect to the mix water (Table I, compositions Nos. 10 and 11).

Even at a magnesium contamination of 3% of $MgCl_2$ (which may be encountered if the slurry is pumped in a formation which contains marine salts such as Carnallite, Bischofite, and/or Tachyhydrite), suitable amounts of citric acid will maintain the yield value at about 0.6 Pa without this significantly influencing the thickening time nor the compressive strength (Table I, composition No. 19).

The slurry compositions according to the invention are therefore absolutely compatible with magnesium salts, whilst, in the prior art, the presence of magnesium salts resulted in a flash set. In fact, according to present techniques, if magnesium exists in the rocks traversed, cementing with Portland cement cannot be suitably effected.

If no dissolution of magnesium salts is to be feared, the systems according to the invention will preferably be retarded by borax instead of citric acid (always in combination with lignosulfonate), as borax guarantees better rheological properties even at high temperatures.

4. Free water:

The phenomenon of free water does not raise any problem if the systems according to the invention are used, since none of the formulations tested yielded more than 1% of free water.

5. Fluid loss:

The fluid loss properties of the slurries according to the invention may be controlled to a certain extent by a sulfonated polymer. This possibility depends on what control is to be carried out and what degree of bonding with the salt formation is deemed necessary.

The following examples illustrate the invention without, however, limiting the scope thereof.

A. Preparation of the slurry:

The preparation of the slurry, the determination of the thickening time and of the compressive strength were carried out in accordance with API standard 10. The plastic viscosity and the yield value data were calculated by last square regression on the FANN viscosimeter readings at 600, 300, 200, 100 r.p.m.

All slurries are based on the cement Dykerhoff Class G, Red Label (tropical). The slurries were prepared by mixing the chlorides and the liquid additives in the mix water and other solid additives with the cement.

B. The additives

In the table hereinafter, the abbreviations have the following meanings:

A: sodium silicate solution (30°-32°Bé)
A*: retarder of modified lignosulfonate type
B: dispersant conventionally used in oil well cementing formulations, consisting of the sodium salt of the condensation product of naphthalenesulfonate and formaldehyde.
C: borax
D: citric acid
E: sodium chloride
F: magnesium chloride

TABLE I

| No | A l/t | A* l/t | B l/t | C % by weight of cement | D % by weight of cement | E % by weight of water | F % by weight of water | 1 | 2 | 3 | 4 |
|---|---|---|---|---|---|---|---|---|---|---|---|
| 1 | — | 1.4 | — | — | — | 18 | — | 90 | 20.5 | 15.5 | 2.6 |
| 2 | — | — | 4.44 | — | — | 18 | — | 82 | 15.4 | 11.9 | 2.4 |
| 3 | — | — | — | 1.0 | — | 18 | — | 128 | 21.4 | 6.7 | 2.8 |
| 4 | — | — | — | — | 0.2 | 18 | — | 156 | 26.1 | 12.6 | 2.8 |
| 5 | 66.6 | 1.4 | — | — | — | 18 | — | 80 | 20.3 | 18.4 | 4.6 |
| 6 | 66.6 | — | 4.44 | — | — | 18 | — | 53 | 14.7 | 15.9 | 4.2 |
| 7 | 66.6 | — | — | 1.0 | — | 18 | — | 79 | 27.0 | 10.0 | 4.0 |
| 8 | 66.6 | — | — | — | 0.2 | 18 | — | 150 | 31.4 | 2.1 | 3.8 |
| 9 | 69.5 | 1.4 | 4.44 | — | — | 18 | — | 45 | 26.1 | 0.9 | 3.0 |
| 10 | 69.5 | 1.4 | 4.44 | — | — | 30 | — | 48 | 24.7 | 1.3 | 3.5 |
| 11 | — | — | 4.44 | — | — | 30 | — | 215 | 16.5 | 8.7 | 4.3 |
| 12 | 71.4 | 1.4 | 4.44 | 0.75 | — | 18 | — | 78 | 30.2 | 0.8 | 2.9 |
| 13 | 71.4 | 1.4 | 4.44 | 1.0 | — | 18 | — | 92 | 29.4 | 0.7 | 2.7 |
| 14 | 71.4 | 1.4 | 4.44 | 1.5 | — | 18 | — | 132 | 23.5 | 1.4 | 2.1 |
| 15 | 61.0 | 1.2 | 4.44 | 1.5 | — | 18 | 3 | | 27.8 | 13.9 | 4.6 |
| 16 | 61.0 | 1.2 | 4.44 | — | 0.1 | 18 | — | 205 | 29.5 | 8.6 | 3.9 |
| 17 | 61.0 | 1.2 | 4.44 | — | 0.2 | 18 | — | 267 | 32.1 | 1.9 | 3.7 |
| 18 | 61.0 | 1.2 | 4.44 | — | 0.3 | 18 | — | >300 | 31.8 | 0.4 | 2.9 |
| 19 | 61.0 | 1.2 | 4.44 | — | 0.3 | 18 | 3 | 156 | 28.3 | 0.6 | 3.8 |

1 Thickening time according to API Spec 10: "Operating Thickening time, schedule 7g5"
2 Compressive strength according to API Spec 10: "Operating Strength Tests, schedule 5Sg7" Aging time: 24 hours
3 Yield value at 20 deg. C. [Pa]
4 Plastic viscosity at 20 deg C. [$10^{-2}$ Pa.s.]

What is claimed is:

1. A process for cementing a borehole passing through a salt formation comprising the step of injecting into the annual space, the composition consisting of a cement, mix water and additives selected so as to be capable of reacting or participating in a reaction on the salts of the formations traversed in order to form fibrous minerals capable of solidly bonding the cement and the salt strata traversed, said mix water containing at the start less than 18 percent sodium chloride by weight of mix water, and containing a set retarding amount of a combination of a lignosulfonate and borax or citric acid.

2. A process for cementing a wellbore passing through a salt formation comprising the step of injecting into the annual space a composition consisting of a cement, mix water containing at the start less than 18% sodium chloride by weight, a saturated sodium silicate solution in an amount of between about 35 l/t of slurry and about 150 l/t of slurry, and a set retarding amount of a combination of a lignosulfate and borax citric acid, said composition adapted to react with the salts of formations traversed to form fibrous minerals able to bond the cement and salt strata traversed.

3. The process of claim 2, wherein lignosulfonate is present in an amount of about 1.5 l/t, borax is present in an amount of 0.5 to 2.0% by weight of the slurry and citric acid is present in an amount of about 0.1 to 0.4% by weight of the slurry.

* * * * *